United States Patent [19]
You

[11] Patent Number: 5,901,763
[45] Date of Patent: May 11, 1999

[54] WORKING BENCH EQUIPPED WITH CUTTING RAIL ALIGNMENT FOR ELECTRIC CIRCULAR SAW

[76] Inventor: Yen-Jen You, 3F, No. 23, Alley 53, Lane 12, Sec. 3, Pa-Der Rd., Taipei, Taiwan

[21] Appl. No.: 09/065,927

[22] Filed: Apr. 24, 1998

[30] Foreign Application Priority Data

Mar. 18, 1998 [TW] Taiwan ................................. 87203957

[51] Int. Cl.⁶ ................................. B26D 5/08; B25H 1/04
[52] U.S. Cl. ..................... 144/286.5; 83/468.3; 83/581; 83/745; 144/286.1; 269/303
[58] Field of Search ............................. 269/289 R, 303, 269/305, 900; 144/286.1, 286.5, 287, 1.1; 83/468.3, 468.7, 522.11, 522.18, 574, 581, 745

[56] References Cited

U.S. PATENT DOCUMENTS

| | | | |
|---|---|---|---|
| 2,677,399 | 5/1954 | Getsinger | 83/468.3 |
| 3,066,710 | 12/1962 | Silken | 83/468.3 |
| 3,379,229 | 4/1968 | Siegal | 269/303 |
| 4,497,477 | 2/1985 | Abel | 269/303 |
| 4,892,021 | 1/1990 | Sanderson | 269/303 |
| 4,920,845 | 5/1990 | Blanchette | 83/581 |
| 4,939,968 | 7/1990 | Stoof | 269/303 |
| 5,050,473 | 9/1991 | Ingram et al. | 83/581 |
| 5,135,036 | 8/1992 | Caron | 144/286.5 |
| 5,271,305 | 12/1993 | Peters et al. | 83/581 |
| 5,318,284 | 6/1994 | Demmeler et al. | 269/303 |
| 5,362,036 | 11/1994 | Whiteman | 269/900 |
| 5,647,420 | 7/1997 | Michell | 83/468.3 X |

*Primary Examiner*—W. Donald Bray
*Attorney, Agent, or Firm*—Dougherty & Troxell

[57] ABSTRACT

The working bench has a bench face marked with parallel and equally spaced scales as checker. Each intersection point is formed with a through hole for fixing the alignment or the work piece so as to facilitate the cutting operation. The bench face is further formed with a dividing disc and a ruler with metric and British scales. The cutting rail alignment includes an engaging board, a clamp, a rail slat, a rail seat, lifting shafts and a rail seat support rod. The engaging board having a rotary shaft at one end for fitting into a central through hole of the dividing disc for selecting suitable direction. The clamp serves to clamp a free end of the engaging board so as to stably locate the engaging board by the selected direction. The width from the inner side of the saw blade of the circular saw to outer edge of the base of the circular saw is first measured and then the rail slat is fixed on the rail seat by the width. The lifting shafts are fitted into the through holes on one side of the rail seat, so that the rail seat is rotatable to cover and press the work piece. The rail seat support rod serves to clamp a free end of the rail seat.

5 Claims, 7 Drawing Sheets

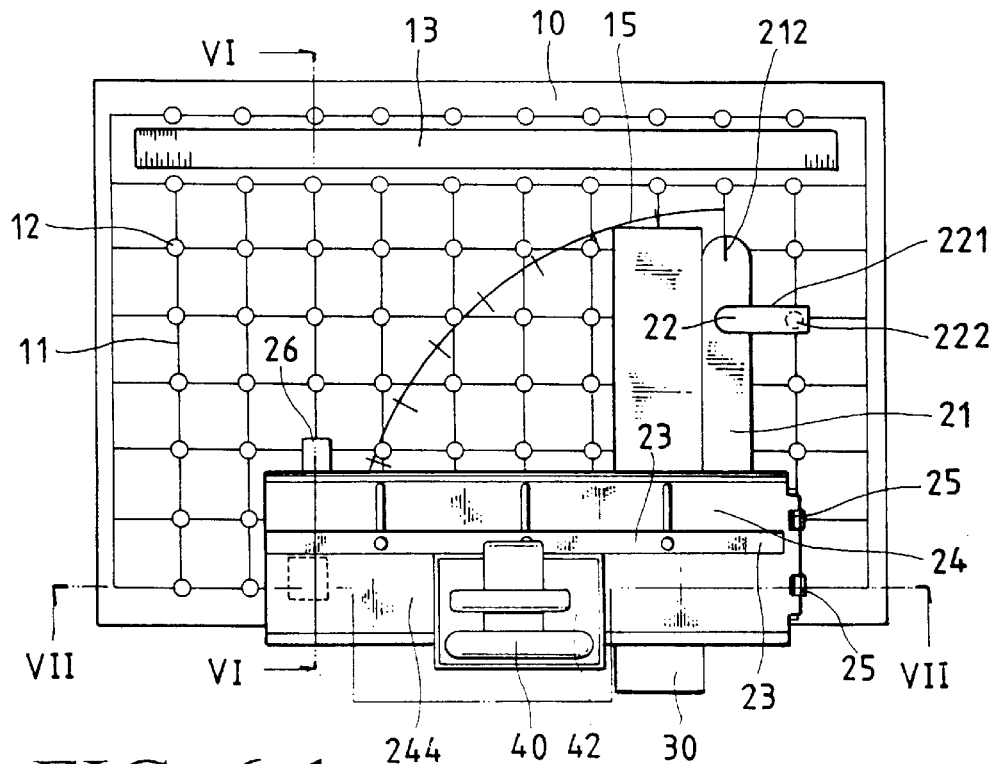
FIG. 6-1
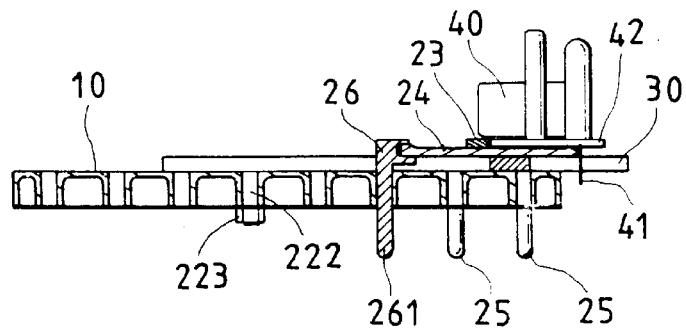
FIG. 6-2  VI-VI
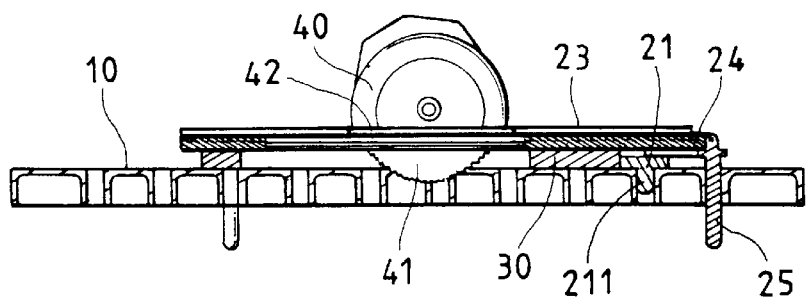
FIG. 6-3  VII-VII

WORKING BENCH EQUIPPED WITH CUTTING RAIL ALIGNMENT FOR ELECTRIC CIRCULAR SAW

BACKGROUND OF THE INVENTION

The present invention relates to a working bench equipped with cutting rail alignment for electric circular saw. The working bench has a bench face marked with parallel and equally spaced scales and through holes for fixing the alignment. The bench face is also formed with a dividing disc and a ruler, serving as a DIY working bench.

In DIY field, carpentry is the most popular work. In carpentry, a working bench is inevitable. Carpentry includes cutting, sawing, planing, grinding, drilling, nailing, etc. However, it is often difficult for a none-professional person to do these works very well.

SUMMARY OF THE INVENTION

It is a primary object of the present invention to provide a working bench equipped with cutting rail alignment for electric circular saw. The electric circular saw can be leaned against a rail of the alignment and conveniently operated to quickly and precisely cut off a work pziece with any shape by any angle.

It is a further object of the present invention to provide a working bench equipped with cutting rail alignment for electric circular saw. A rail slat is adjustably fixed on a rail seat so as to adjustably define the width of the rail for different specifications of electric circular saws.

It is still a further object of the present invention to provide a working bench equipped with cutting rail alignment for electric circular saw. The lifting shafts are fitted into the through holes on one side of the rail seat, serving as a hinge structure, whereby the rail seat is liftable and rotatable to cover and press the work piece. The rail seat support rod serves to clamp and locate a free end of the rail seat so as to facilitate the operation.

It is still a further object of the present invention to provide a working bench equipped with cutting rail alignment for electric circular saw. The working bench includes an engaging board which on one hand indicates the direction and on the other hand provides stabilizing and locating effect for the work piece to be cut.

According to the above objects, the working bench of the present invention has a bench face marked with parallel and equally spaced scales as checker. Each intersection point is formed with a through hole for fixing the alignment. The bench face is further formed with a dividing disc and a ruler with metric and British scales. The cutting rail alignment includes an engaging board, a clamp, a rail slat, a rail seat, lifting shafts and a rail seat support rod. The engaging board having a rotary shaft at one end for fitting into a central through hole of the dividing disc for selecting suitable direction. The clamp serves to clamp a free end of the engaging board so as to stably locate the engaging board by the selected direction. The width from the inner side of the saw blade of the circular saw to outer edge of the base of the circular saw is first measured and then the rail slat is fixed on the rail seat by the width. The lifting shafts are fitted into the through holes on one side of the rail seat, whereby the rail seat is rotatable to cover and press the work piece. The free end of the rail seat is padded by a pad member having a thickness equal to that of the work piece. Then the rail seat support rod is used to clamp a free end of the rail seat, whereby the electric circular saw can be leaned against the rail and moved forward to precisely and quickly cut off the work piece.

The present invention can be best understood through the following description and accompanying drawings, wherein:

BRIEF DESCRIPTION OF THE DRAWINGS

FIG. 3-1 is a front view of the bench face of the present invention;

FIG. 3-2 is a side sectional view of the bench face of the present invention;

FIG. 4-1 is a front view of the bench face, showing that the direction of the engaging board is selected by means of the dividing disc and the engaging board is fixed by the clamp;

FIG. 4-2 is a side sectional view according to FIG.4-1;

FIG. 6-1 is a front view of the bench face, showing that the lifting shafts are fitted into the through holes, permitting the rail seat to be rotated to cover and press the work piece;

FIG. 6-2 is a sectional view taken along line VI—VI of FIG. 6-1;

FIG. 6-3 is a sectional view taken along line VII—VII of FIG. 6-1; and

DETAILED DESCRIPTION OF THE PREFERRED EMBODIMENT

Figure 1:
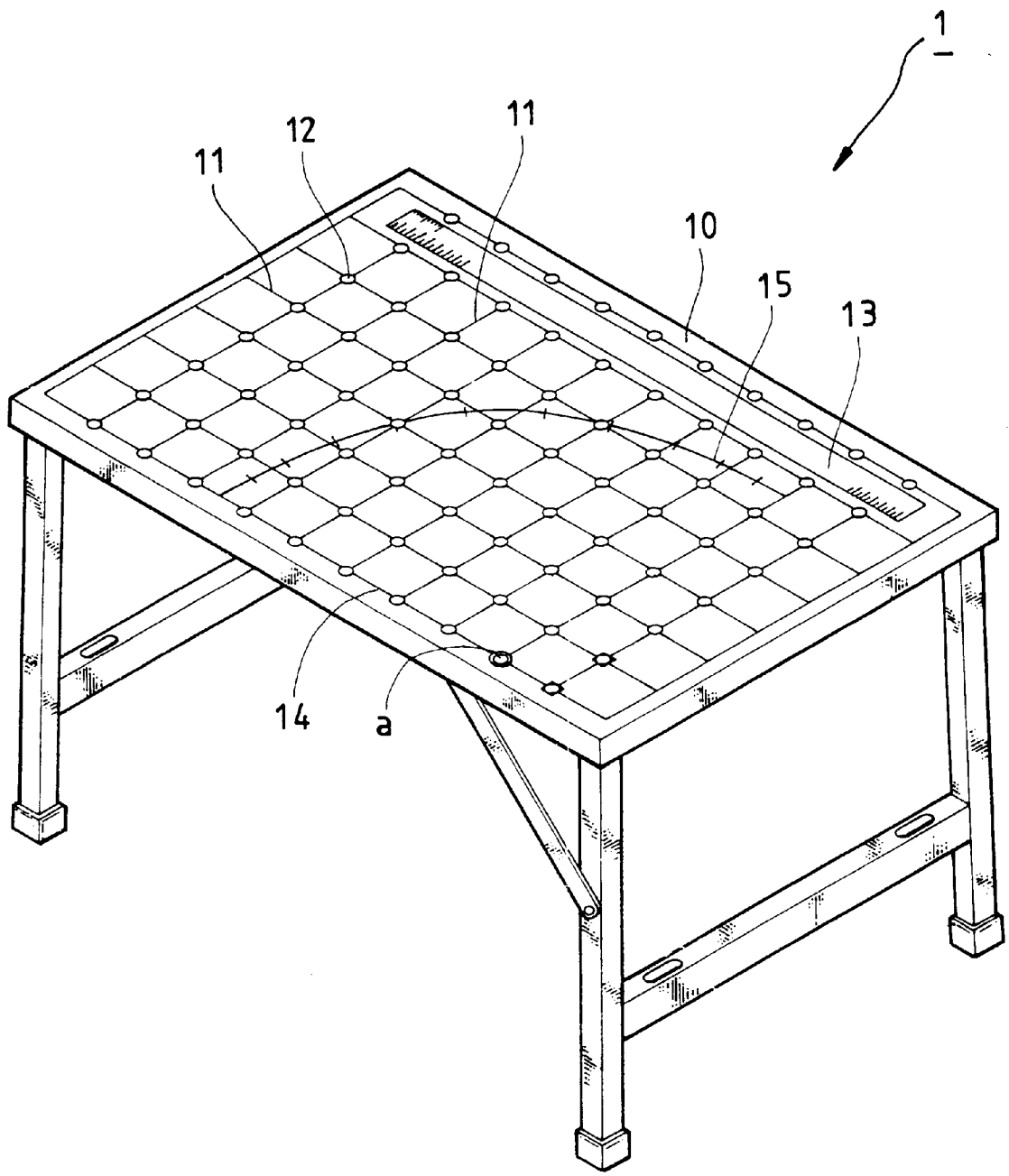
FIG. 1 is a perspective assembled view of the working bench of the present invention.
Figures 1, 3:
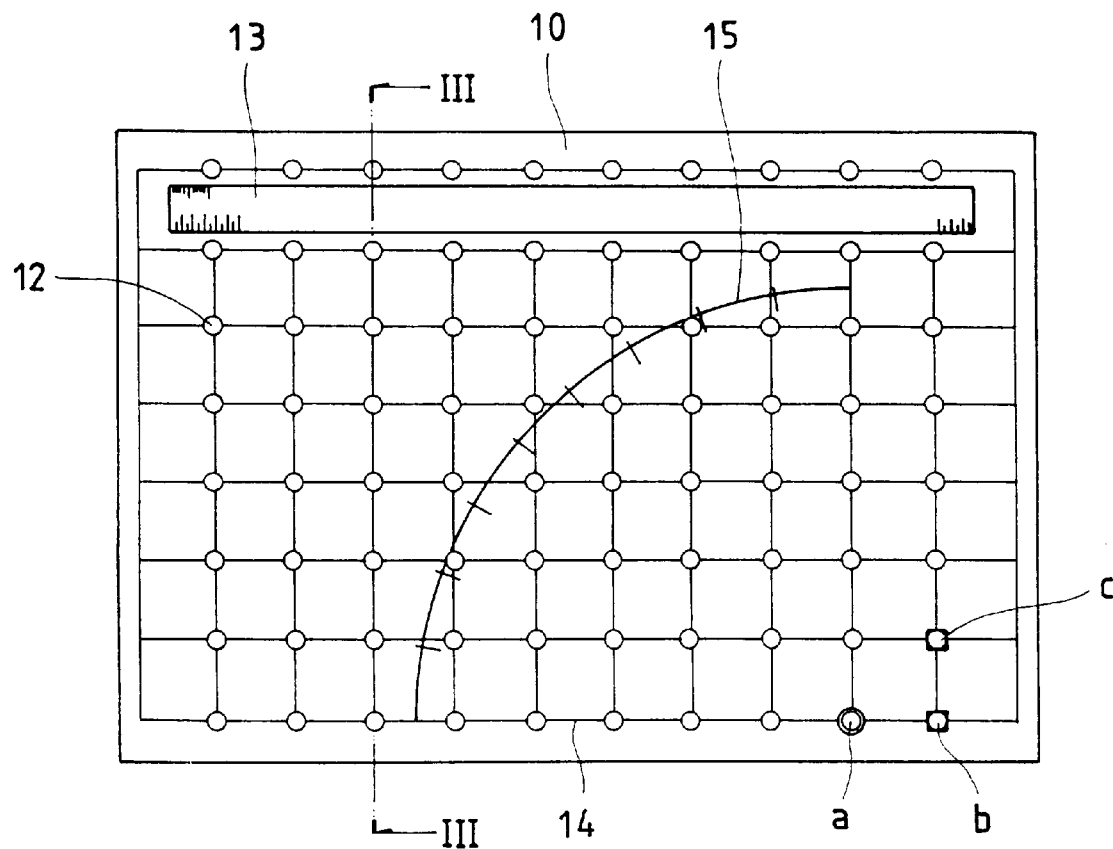
Figures 2, 3:
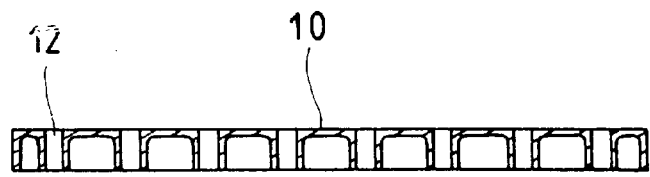

Please refer to FIGS. 1 and 3. The working bench 1 of the present invention has a bench face 10 marked with parallel and equally spaced scales 11 as checker. Each intersection point is formed with a through hole 12 for fixing a working alignment or a work piece.

Near front edge of the bench face 10 is formed a ruler 13 marked with metric and British scales. A first latitudinal scale line opposite to the ruler 13 serves as a standard line 14. With a certain through hole a on the standard line 14 as a center, a dividing arc 15 of 90 degrees (one fourth of a circle ) or 180 degrees (one half of a circle) is marked on the bench face. In this embodiment, the dividing arc 15 is of 90 degrees, one fourth of a circle. The operation is thus usually based on the central through hole a of the dividing arc 15.

Figure 2:
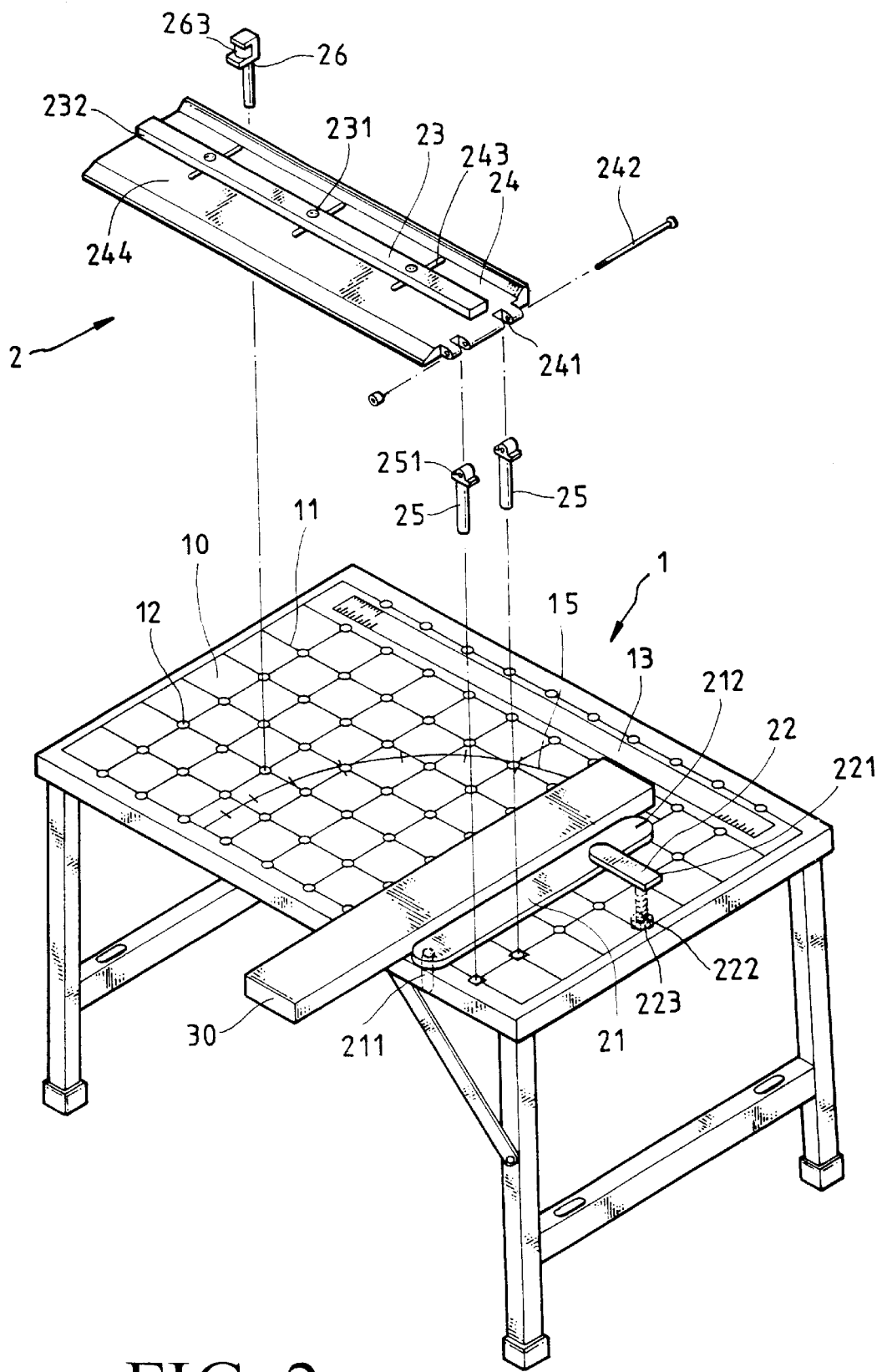
FIG. 2 is a perspective disassembled view of the cutting rail alignment of the present invention.

Please refer to FIG. 2. The cutting rail alignment 2 is mounted on the working bench 1, including an engaging board 21, a clamp 22, a rail slat 23, a rail seat 24, a lifting shaft 25 and a rail seat support rod 26.

The engaging board 21 is an elongated board member having a vertically extending rotary shaft 211 at one end. The rotary shaft 211 is fitted into the central through hole a of the dividing arc 15. By means of a locating mark 212, a suitable direction of the dividing arc 15 is selected to rotate the engaging board.

The clamp 22 has a pressing block 221 and a vertically extending thread rod 222 for fitting into a through hole of the bench face. A butterfly nut 223 is used to tighten the thread rod 222 so as to fixedly clamp the engaging board 21.

The rail slat 23 is formed with several thread holes 231 for screwing on the rail seat 24. The rail slat 23 has an engaging edge 232 with a certain height for engaging with an electric circular saw.

The rail seat 24 is formed with a pivot hole 241 at one end for a pivot shaft 242 to pass therethrough for connecting with the lifting shaft 25. The rail seat 24 is formed with slide slots 243 for parallelly slidably adjusting the rail slat 23 on the rail seat. The engaging edge 232 of the rail slat and the rail seat 24 together define a rail 244.

The lifting shaft 25 has a pivot hole 251 for the pivot shaft 242 to pass therethrough to form a hinge structure connected on one side of the rail seat 24. Accordingly, the rail seat 24 can be rotated to cover and press the work piece 30.

Figure 7:
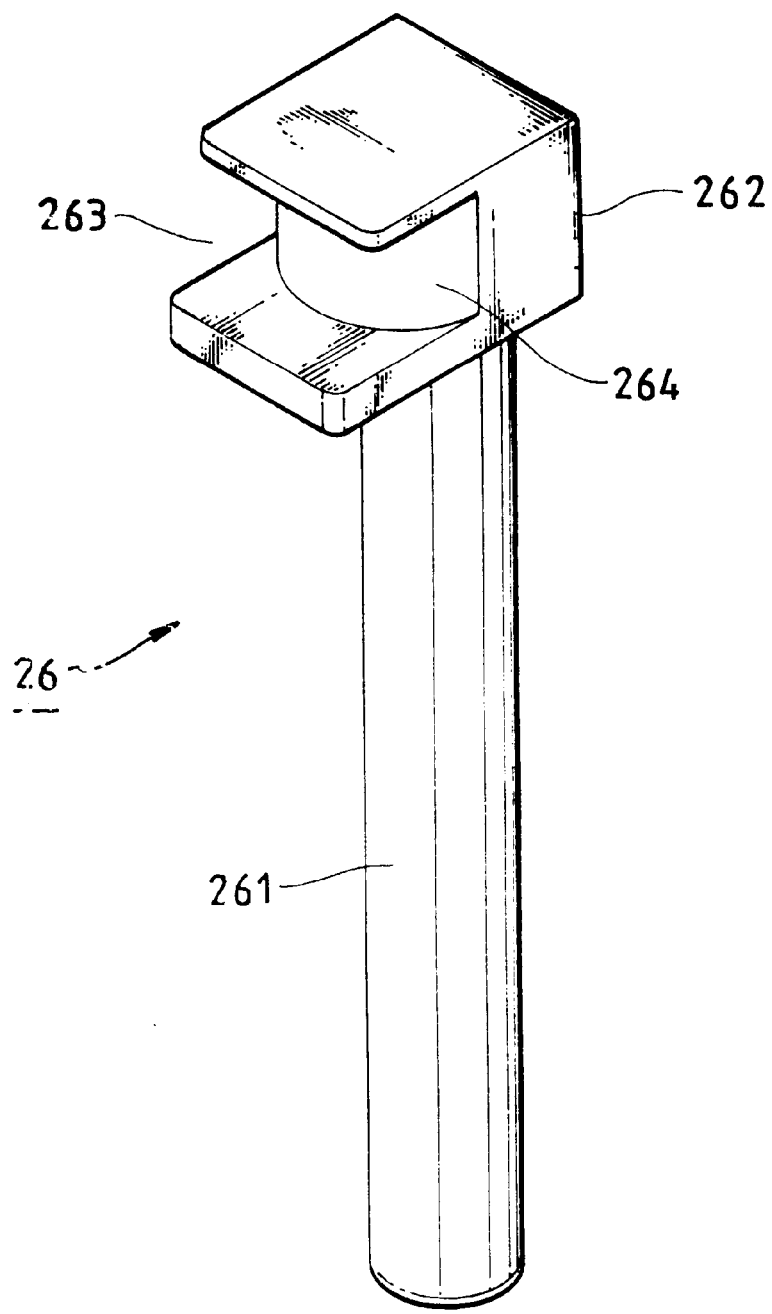
FIG. 7 is a perspective view of the rail seat support rod of the present invention.

The rail seat support rod 26 (as shown in FIG. 7) includes a downward extending shaft rod 261 and a support block 262 at upper end. The support block 262 is formed with a chuck 263 having a circular inner wall face 264, whereby the support rod 26 can rotatably clamp and support the end of the rail seat 24.

Figures 1, 4:
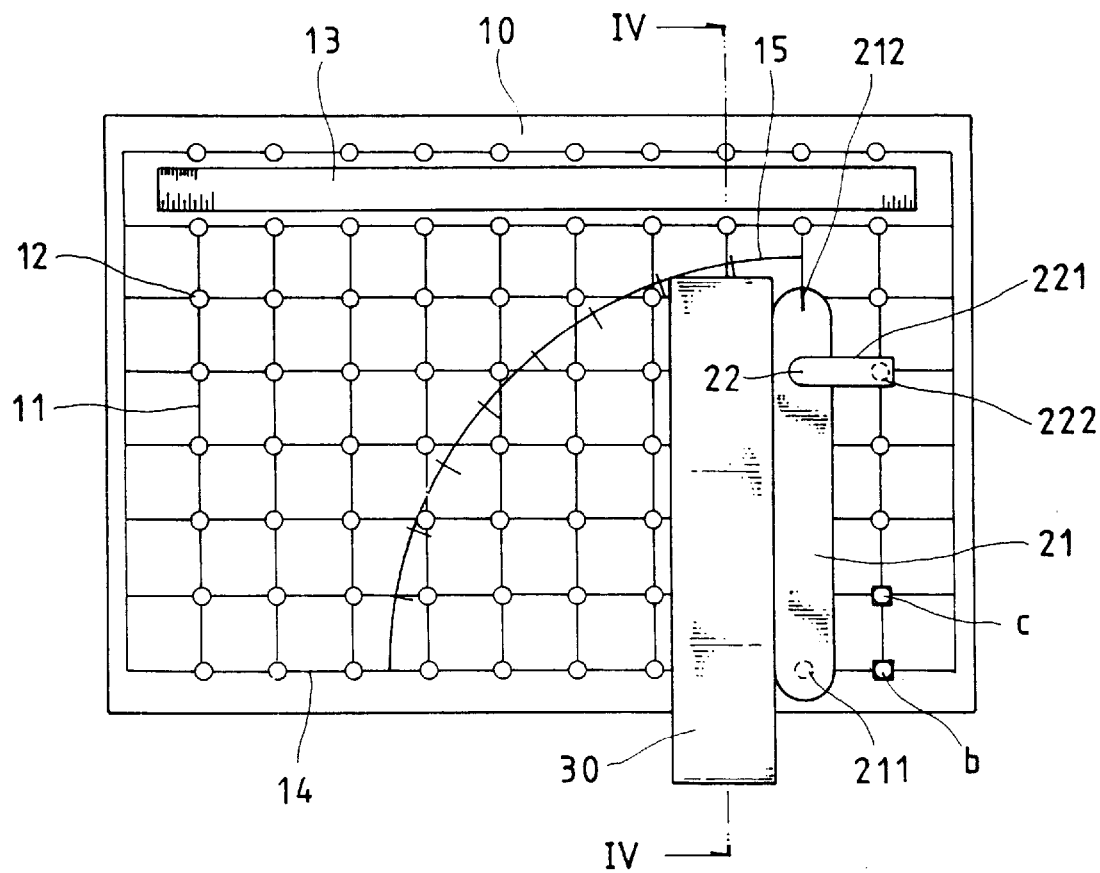
Figures 2, 4:
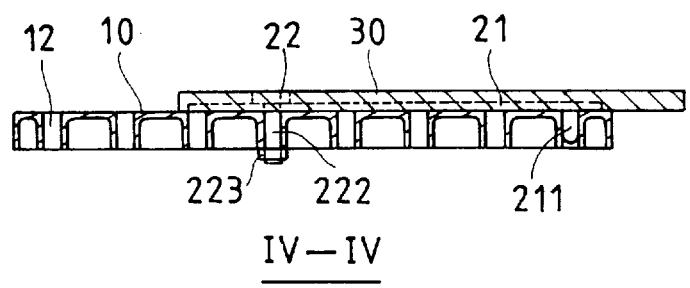
Figure 5:
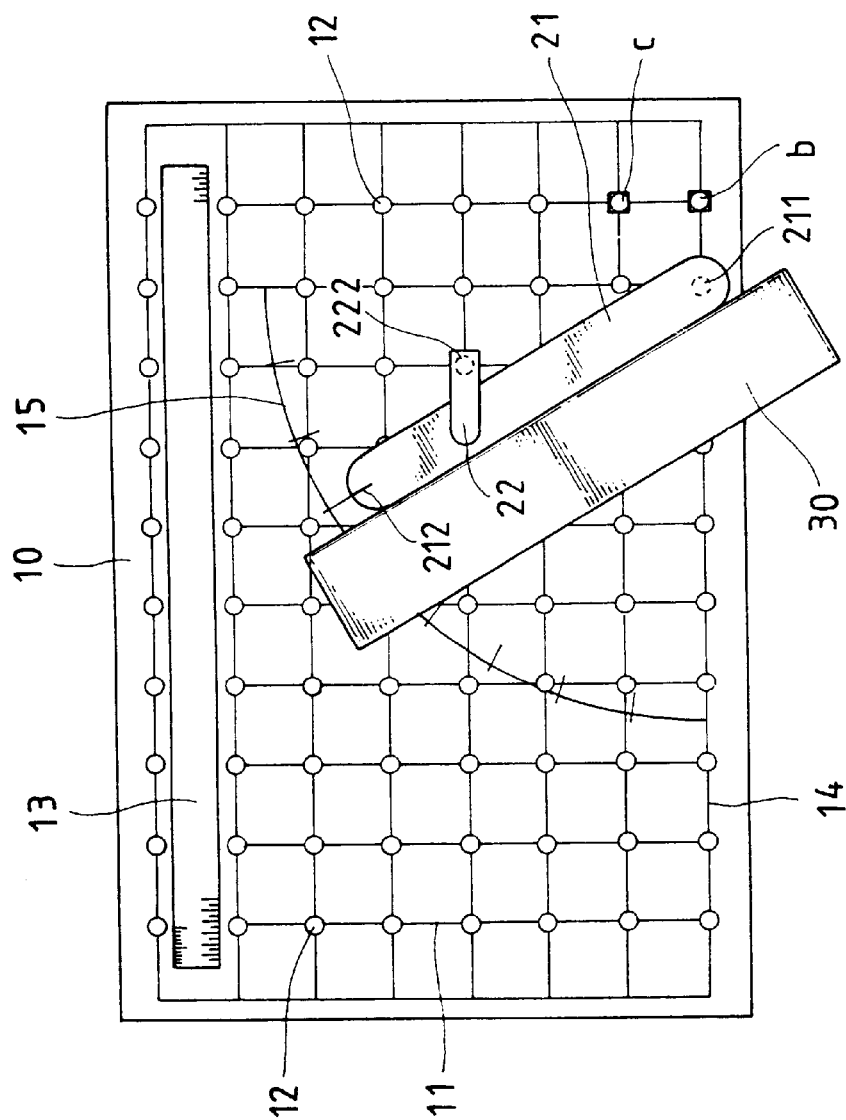
FIG. 5 is a front view of the bench face, showing that another direction of the engaging board is selected by means of the dividing disc and the engaging board is fixed by the clamp.

Please refer to FIGS. 4 to 6. When using the working bench, the rotary shaft 211 of the engaging board 21 is fitted into the central through hole a of the dividing arc 15. Then the other end of the engaging board 211 is swung to align the locating mark 212 with the dividing arc. (The engaging board 21 is rotated and located according to the cutting angle as shown in FIGS. 4 and 5. Then the end of the engaging board 21 is fixed at a suitable through hole by the clamp 22. The thread rod 222 of the clamp 22 is fitted into a suitable through hole of the bench face 10 and tightened by the butterfly nut 223. The engaging board 21 on one hand indicates the direction and on the other hand provides stabilizing and locating effect for the work piece to be cut. The work piece 30 is placed on the bench face 10 and tightly engaged with the engaging board 21.

First, the width from the inner side of the saw blade 41 of the circular saw 40 to outer edge of the base of the circular saw is measured. The width is used as the standard distance for fixing the rail slat 23 on the rail seat 24. The rail slat 23 is placed on the slide slots 243 and moved to the standard distance. Then the rail slat 23 is fixed at the thread holes 231 to form the rail 244.

Then the lifting shafts 25 at the end of the rail seat 24 are respectively fitted into the through holes b, c on the first and second scales, whereby the rail seat 24 is latitudinally and rotatably positioned. The work piece 30 is placed on the bench face 24 and pressed by the rail seat 10 thereunder. A pad member having the same thickness as the work piece is placed at free end of the rail seat to keep the rail seat stable. The shaft rod 261 of the rail seat support rod 26 is fitted into a through hole on lateral side of the rail seat 24 and then the shaft rod 261 is rotated to make the chuck 263 snugly clamp the rail seat 24 and prevent the rail seat 24 from being deflected. The base 42 of the circular saw 40 is leaned against the rail 244 of the rail seat 24 and pushed forward so as to smoothly and precisely cut off the work piece. By means of the previous orientation, the work piece can be cut at any angle.

According to the above arrangement, the angle of the engaging board can be adjusted by means of the dividing disc as necessary. Also, the lifting shafts are adjustably fitted in the through holes so that the rail seat can be lifted or lowered in accordance with the thickness of the work piece. Therefore, the rail seat can be rotated to stably cover and press the work piece. This enables an operator to cut the work piece without deflection. Moreover, the rail seat support rod serves to clamp the free end of the rail seat so as to provide a stabilizing effect for the rail seat during cutting operation.

The parallel and equally spaced scales and through holes enable an operator to fixedly locate the cutting rail alignment on the bench face in accordance with the size and shape of the work piece. Therefore, the work piece can be reliably and tightly clamped at a predetermined angle so as to facilitate the cutting operation.

It should be noted that the above description and accompanying drawings are only used to illustrate one embodiment of the present invention, not intended to limit the scope thereof. Any modification of the embodiment should fall within the scope of the present invention.

What is claimed is:

1. A working bench having a cutting rail alignment device for an electric circular saw, said working bench having a bench face on which the cutting rail alignment device is mounted for cutting a work piece, said working bench comprising:

a bench face marked with intersecting scales, each intersection point being formed with a through hole, the bench face further having a dividing arc and a ruler; and a cutting rail alignment device including an engaging board, a clamp, a rail slat, a rail seat, lifting shafts and a rail seat support rod, the engaging board having a shaft at one end fitting into a central through hole of the dividing arc, the clamp clamping a free end of the engaging board so as to stably locate the engaging board on the bench face, the rail slat being adjustably mounted on the rail seat to define a rail, an end of the rail seat being pivotally fixed on the bench face by a hinge structure formed by the lifting shafts fitted into through holes of the bench face, the rail seat being rotatable to cover and press a work piece located on the bench face, the rail seat support rod serving to clamp a free end of the rail seat, whereby the electric circular saw is placed against the rail and moved forward to precisely cut off the work piece.

2. The working bench as claimed in claim 1, wherein the shaft vertically extends from a first end of the engaging board and further comprising a locating mark located on a second end of the engaging board.

3. The working bench as claimed in claim 1, wherein the clamp comprises a pressing block with a vertically extending threaded rod fitting into one of the through holes of the bench face, and a butterfly nut threaded onto the threaded rod so as to fixedly clamp the engaging board.

4. The working bench as claimed in claim 1, wherein the rail seat is formed with a plurality of slide slots and the rail slat is formed with threaded holes, whereby the rail slat is adjustably mounted on the rail seat by screws passing through the slide slots and engaging the threaded holes to adjustably define the width of the rail for different electric circular saws.

5. The working bench as claimed in claim 1, wherein the rail seat support rod comprises a downwardly extending shaft rod and a support block at an upper end thereof, the support block having a chuck with a circular inner wall face.

* * * * *